United States Patent [19]

Widlar

[11] Patent Number: 4,669,026

[45] Date of Patent: May 26, 1987

[54] POWER TRANSISTOR THERMAL SHUTDOWN CIRCUIT

[75] Inventor: Robert J. Widlar, Jalisco, Mexico

[73] Assignee: National Semiconductor Corporation, Santa Clara, Calif.

[21] Appl. No.: 773,693

[22] Filed: Sep. 9, 1985

[51] Int. Cl.$^4$ .............................................. H02H 5/04
[52] U.S. Cl. ...................................... 361/103; 361/87; 361/93; 323/278; 323/279
[58] Field of Search ..................... 361/18, 87, 93, 103; 323/278, 279, 289, 317, 907

[56] References Cited

U.S. PATENT DOCUMENTS

| | | | |
|---|---|---|---|
| 3,103,617 | 9/1963 | Schneider et al. | 323/279 |
| 3,796,943 | 3/1974 | Nelson et al. | 361/18 |
| 4,146,903 | 3/1979 | Dobkin | 361/103 |

OTHER PUBLICATIONS

IEEE Journal of Solid-State Circuits, "New Development in IC Voltage Regulator", Robert J. Wildar, vol. SC-6, No. 1, Feb.

Primary Examiner—A. D. Pellinen
Assistant Examiner—Jeffrey A. Gaffin
Attorney, Agent, or Firm—Gail W. Woodward

[57] ABSTRACT

A thermal shutdown circuit for use with a high power transistor which incorporates a sense emitter. A differential amplifier is driven from the transistor base and the sense emitter and has an output that is coupled to the power transistor base. When the sense emitter potential exceeds the base potential, the amplifier output will pull the base down so as to limit the current in the power transistor. For a silicon transistor, the circuit will act to limit the hottest portion of the sense emitter to a maximum of about 250° C. When there are no hot spots and the sense emitter is heated uniformly, heating of the transistor will be limited to about 200° C.

6 Claims, 2 Drawing Figures

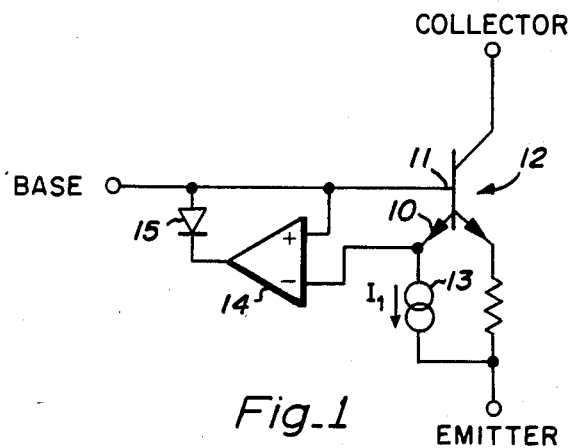
Fig_1
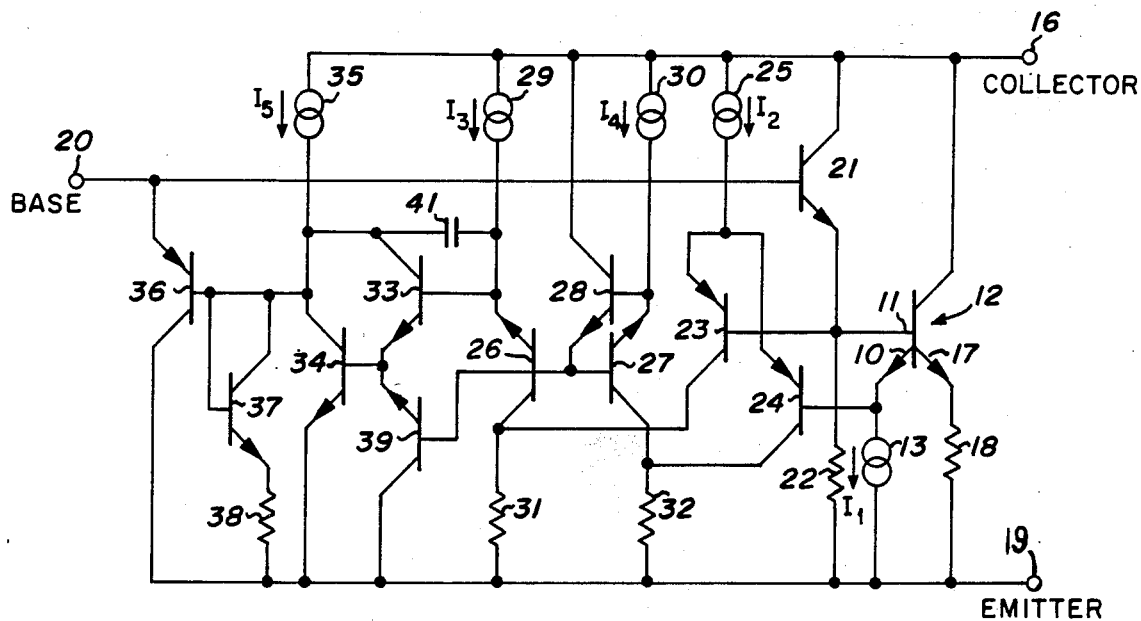
Fig_2

POWER TRANSISTOR THERMAL SHUTDOWN CIRCUIT

BACKGROUND OF THE INVENTION

My copending patent application Ser. No. 698,043 which was filed Feb. 4, 1985, is titled POWER TRANSISTOR EMITTER BALLASTING and is assigned to the assignee of the present invention. This application teaches the use of a plurality of individual small emitters connected effectively in parallel through individual ballasting resistors to create a power transistor and is incorporated herein by reference. This application also teaches a distributed sense emitter associated with the power device emitters for responding to hot spots in the power transistor.

U.S. Pat. No. 4,146,903 issued to Robert C. Dobkin on Mar. 27, 1979, and is assigned to the assignee of the present invention. Its teaching is also incorporated herein by reference. This patent teaches the incorporation of a sense emitter in a power transistor in close proximity with the power emitter. Thermal gradients are sensed by comparing the potential developed between the sense emitter and a remotely located emitter. Means are included for turning the power transistor off when the gradient exceeds some predetermined threshold value. This is done by connecting a differential amplifier having a fixed offset potential between the sense emitter and the remote emitter. The differential amplifier output is coupled to the base of the power transistor. Thus, when the potential difference exceeds the offset, the power transistor base will be pulled low so as to shut it off. This arrangement has been used successfully in the LM138 series voltage regulators and has several advantages over prior art approaches. However, it requires a remote emitter that is not heated by the power emitter, or at least is heated to a lesser degree, to produce a gradient response.

SUMMARY OF THE INVENTION

It is an object of the invention to provide a circuit that responds to the potential on a sense emitter in a power transistor structure and reduces conduction in the power transistor when the sense emitter-base potential indicates excessive temperature.

It is a further object of the invention to employ a differential amplifier having inputs coupled between the base and sense emitter of a power transist and an output coupled to the base circuitry so that the power transistor conduction is reduced when the sense emitter-base potential indicates excessive temperature.

The emitter-base voltage of a junction transistor is an accurate indicator of junction temperature. These transistors are commonly used in power IC's as sensors to provide thermal overload protection. However, a single sensor is usally located near a relatively large power transistor and it does not respond directly to peak temperatures within the power transistor. The approach described here uses a distributed sensor serpentined throughout the power array, that does respond to peak temperature.

It is practical to bias a distributed sense emitter at a current that results in zero emitter-base potential when it is uniformly heated to 200° C. Higher temperatures cause a reversal in emitter-base potential, but heating above 200° C. can be prevented by employing control circuitry to reduce dissipation in the power transistor when the sense potential reverses as it will at higher temperatures. If only half of the sense emitter is at the peak temperature it will have to rise an additional 20° C. to 220° C. for zero sense potential. With one-tenth the sensor at peak temperature, the sense potential is zero near 250° C. Thus, peak temperature is held to a reasonable value even when severe hot spots develop within the power array. This contrasts to conventional methods where destructive temperatures can develop with worst case conditions.

An advantage of the distributed sensor is that it can respond to an over temperature condition with a delay measured in tens of microseconds rather than the several milliseconds required for a sensor located outside the array. As a result, it is not necessary to limit the power dissipation electrically as was formerly required. Electrical power limiting must be based upon expected worst case conditions with component tolerances factored in. Eliminating this power limiting not only increases peak power ratings but also increases the continuous power rating that can be guaranteed. At the same time, better control of peak junction temperature is provided. In sum, the limit is established by the actual device temperature and not a hypothetical safe operating area limit based upon assumed operating conditions.

In the circuit of the invention a differential transistor pair has its bases coupled to the base and sense emitter of a power transistor to be protected. A relatively small current is pulled out of the sense emitter to establish a sense emitter potential that is a function of its hottest portion as described above. The differential pair operates into a current mirror load to provide a single ended drive that feeds a high gain amplifier stage which incorporates a frequency compensation capacitor in the conventional op amp manner. The high gain amplifier in turn drives a control stage that is coupled between the power transistor emitter return and the base drive input. As long as the differential pair is biased by means of a sense emitter running below a critical temperature, the high gain amplifier will be below its conduction threshold and its output will be high so as to turn the control stage off. Under this condition the power transistor will operate normally. When the sense emitter temperature exceeds the critical temperature, the differential pair will drive the high gain amplifier stage into conduction which will turn the control stage on. This will reduce the power transistor bias so that no further increase in temperature will be possible. Since the entire amplifier and control circuit is linear in its operation, and has considerable gain, the critical temperature threshold will operate effectively to prevent power transistor overheating at its hottest spot. The limit is therefore established by the actual device temperature and not a hypothetical safe operating area limit.

BRIEF DESCRIPTION OF THE DRAWING

FIG. 1 is a simplified schematic diagram of the circuit of the invention.

FIG. 2 is a schematic diagram of the circuit of the invention.

DESCRIPTION OF THE INVENTION

A simplified schematic representation of the power transistor, its sense emitter and the thermal-control circuitry is shown in FIG. 1. The sense emitter 10 shares a common base 11 with the power transistor 12. A current source 13 biases the sense emitter at a current $I_1$ that results in zero emitter-base potential at the desired limiting temperature. An op amp 14 serves as the controller. When the potential on the sense emitter 10 is less than the base 11, the op amp output is high and is prevented from coupling into the base circuitry by a diode 15. Should the sense emitter potential rise to that of the base, the output of the top op amp will fall, absorbing the base drive through the diode. Making the sense potential zero at the limiting temperature is a matter of convenience. A non-zero value would require developing a reference voltage in the op amp input circuitry. Were protecting the power transistor the only consideration, the design of the control amplifier would be relatively straightforward. However, in many applications it is desirable that the power transistor go into thermal limit smoothly without oscillations that can cause electrical interference or other undesirable effects. This goal has yet to be achieved with the sensor outside the array, because the thermal delay to the sensor is beyond the electrical time constants that are practical in IC's for loop compensation. With the integral sensor, stabilization of the loop is possible because of much reduced delays. However, developing the required time constants with small capacitors has required internal bias currents of around one microampere. Microampere-level circuitry that must operate properly at temperatures around 175° C. requires new design approaches. A feature of the invention is to use inverted NPN transistors to control low current nodes as will be described below. When the emitter of a transistor is used as a collector, low current gain results, but circuit techniques can be used to compensate for this. What is important is that the inverted transistor does not have the parasitic leakage current of the normal node. This parasitic leakage itself can be in the microampere range at 175° C.

While the circuit of FIG. 1 forward biases the sense emitter and senses its potential with respect to the transistor base, it is to be understood that the sense emitter could be reverse biased and its leakage sensed. This is feasible because the reverse leakage of a PN junction is related to its temperature. This mode of operation, while possible, is not as well behaved as the preferred version described here.

The output transistor and its shutdown circuit can be regarded as a composite transistor structure as shown in the schematic of FIG. 2. The power output transistor 12 has its collector available at terminal 16. Its main emitter 17 is actually composed of a plurality of individual emitters, each one including a series ballast resistor. Resistor 18 represents the effective value of the parallel-connected emitter resistors in the struture described in copending application Ser. No. 698,043 referenced above. Thus, terminal 19 represents the output transistor emitter. Terminal 20 represents the composite transistor base.

Transistor 21 is connected as a Darlington driver, the base of which constitutes the composite transistor base at terminal 20. Resistor 22 returns the emitter of driver transistor 21 to terminal 19.

Transistors 23 and 24 form a differential pair which has its tail current $I_2$ set by source 25. The base of transistor 23 is coupled to the base 11 of output transistor 12 and the base of transistor 24 is coupled to the sense emitter 10. Therefore, the differential pair will respond to the differential voltage between the base 11 and the sense emitter 10 of transistor 12.

Transistors 26 and 27 are coupled together in a current mirror configuration. It will be noted that these two transistors are operated in their inverted state as will be discussed in more detail below. This means that the electrodes shown as collectors will act as emitters and the emitter electrodes will act as collectors. Transistor 28 returns the collector (inverted emitter) of transistor 27 to its base to force it to operate as a diode. Transistor 28 isolates the current mirror base current from the collector of transistor 27. Sources 29 and 30, which supply relatively small matched currents $I_3$ and $I_4$ to the current mirror, act to provide the operating bias current. $I_3$ and $I_4$ are matched and substantially smaller than $I_2$.

Resistors 31 and 32 act as coupling elements which are common to the current mirror and differentially connected transistors 23 and 24.

In normal operation, when sense emitter 10 is low, virtually all of current $I_2$ in source 25 will flow in transistor 24. This will pull the potential of the emitter (inverted collector) of transistor 27 up. This action causes the conduction of transistor 26 to be substantially greater than transistor 27. The collector (inverted emitter) of transistor 26 will therefore be low. Conduction in transistor 26 will pull the base of transistor 33 low so as to turn it and transistor 34 off. As a result $I_5$ from source 35 will pull the base of transistor 36 up so as to turn it off. Current $I_5$ from source 35 will flow in diode connected transistor 37 and resistor 38. These latter two components, along with $I_5$, are selected to develop the desired potential at the base of transistor 36. Inverted transistor 39 provides a current sink return for the emitter current in transistor 33. This current sink ensures that transistor 34 is firmly shut off when transistor 33 is off. For the above described conditions power transistor 12 will operate normally as long as the potential across the ballast resistors 18 is less than the potential across resistor 38. The peak output current is limited at a value that will not fuse the chip metallization or bond wires by limiting the drop across resistor 18.

In the event that power transistor 10 develops a hot spot, or its operating temperature generally rises, the potential at sense emitter 10 will rise toward the base potential. When the differential is zero transistors 20 and 21 will conduct equally. Thus, the potential at the emitter (inverted collector) of transistor 26 will rise and the potential at the emitter (inverted collector) of transistor 27 will fall. If transistors 26 and 27 are matched, sources 29 and 30 are matched and resistors 31 and 32 are matched, the potential at the collector (inverted emitter) of transistor 26 will be insufficient to turn transistors 33 and 34 on. However, a further increase in temperature will cause the potential of sense emitter 10 to exceed the base 11 potential of transistor 12. In this region, near the shutdown condition, the differential amplifier will be in its highest gain state. With this temperature increase the current in transistor 26 will be reduced and transistor 27 current will be increased. When the conduction of transistor 26 is sufficiently reduced, source 29 will pull the base of transistor 33 up and supply current thereto. This will turn transistor 33, and hence transistor 34, on so that current from source 5 will flow in transistor 34. When the conduction in transistor 34 approaches the current in source 35, the base of transistor 36 will be pulled low thereby turning it on. When this occurs, the base of driver transistor 21 will be pulled down so as to control the current in transistor 12.

Capacitor 41 is connected between the input and output of the Darlington pair, transistors 33 and 34, to provide frequency compensation of the shutdown amplifier. This is desirable for stability of the circuit.

The capacitor value required for 41 depends on the transconductance of transistors 26 and 27, with lower operating currents giving lower transconductance and requiring smaller capacitance. The operating current of transistors 26 and 27 cannot be reduced so low that parasitic leakages on the active collectors (inverted emitters) affect bias currents at temperatures near 175° C. The inverted connection puts the tub leakage current on the collectors of transistors 23 and 24 which are operating at high current so that microampere-level leakages have negligible effects. This done, parasitic leakages on the active collectors of transistors 26 and 27 can be reduced to sub-microampere levels with careful design.

EXAMPLE

The circuit of FIG. 2 was constructed in IC form using conventional PN junction isolated monolithic silicon components. The NPN transistors were of vertical double diffused construction and the PNP transistors were of convention lateral construction. The following component values were used.

| COMPONENT | VALUE | UNITS |
| --- | --- | --- |
| Resistor 18 | 0.15 | ohms |
| Resistor 22 | 200 | ohms |
| Current Sink 13 | 100 | microamperes |
| Current Source 25 | 200 | microamperes |
| Current Sources 29, 30 | 1 | microampere |
| Resistors 31, 32 | 800 | ohms |
| Current Source 35 | 750 | microamperes |
| Resistor 38 | 2.3k | ohms |
| Capacitor 41 | 20 | picofarads |

The circuit acted to limit the output transistor current when the sense emitter (at any point along its length) exceeded about 225° C. Since there is a time lag between the generation of heat and its arrival at the nearby sense emitter, the device response to narrow pulses is considerably enhanced by placing the sense emitter close to the power emitter. Whereas, the power transistor was rated at 90 watts at 300° K. it could dissipate 120 watts for a 10 ms pulse, 240 watts for a 1 ms pulse and 600 watts for an 0.2 ms pulse.

The invention has been described and a working example detailed. When a person skilled in the art reads the foregoing description, alternatives and equivalents, within the spirit and intent of the invention, will be apparent. Accordingly, it is intended that the scope of the invention be limited only by the following claims.

I claim:

1. In a power transistor having base, emitter and collector electrodes along with a separate distributed sense emitter thermally associated closely with a plurality of individual emitter elements, a thermal shutdown circuit comprising:
    means for current biasing said distributed sense emitter whereby said distributed sense emitter will operate at a potential determined by its hottest portion;
    means for sensing the differential potential between said distributed sense emitter and said power transistor base; and
    means for reducing the current in said power transistor when the potential at said distributed sense emitter indicates excessive temperature.

2. The circuit of claim 1 wherein said means for sensing comprise a differential input stage having one input coupled to said distributed sense emitter, the other input coupled to said power transistor base, and an output coupled to said means for reducing the current in said power transistor.

3. The circuit of claim 2 wherein said differential input stage output is coupled to a current mirror load which has a differential input, a single-ended output and operates at low current.

4. The circuit of claim 3 wherein said current mirror load is composed of NPN transistors operating in their inverted condition whereby their leakage current at temperatures in the vicinity of the transistor shutdown temperature is small compared to their operating current.

5. The circuit of claim 4 wherein said output of said current mirror load is coupled to the input of a high gain inverting amplifier stage which in turn drives said means for reducing the current in said power transistor.

6. The circuit of claim 5 wherein said current mirror load is operated from current supplies that provide said low current which is maintained at a level that is small with respect to the tail current in said differential input stage.

* * * * *